July 28, 1942.  T. B. CHACE  2,291,026
METHOD OF PRODUCING COMPOSITE METAL PRODUCTS
Original Filed Dec. 26, 1939   3 Sheets-Sheet 1
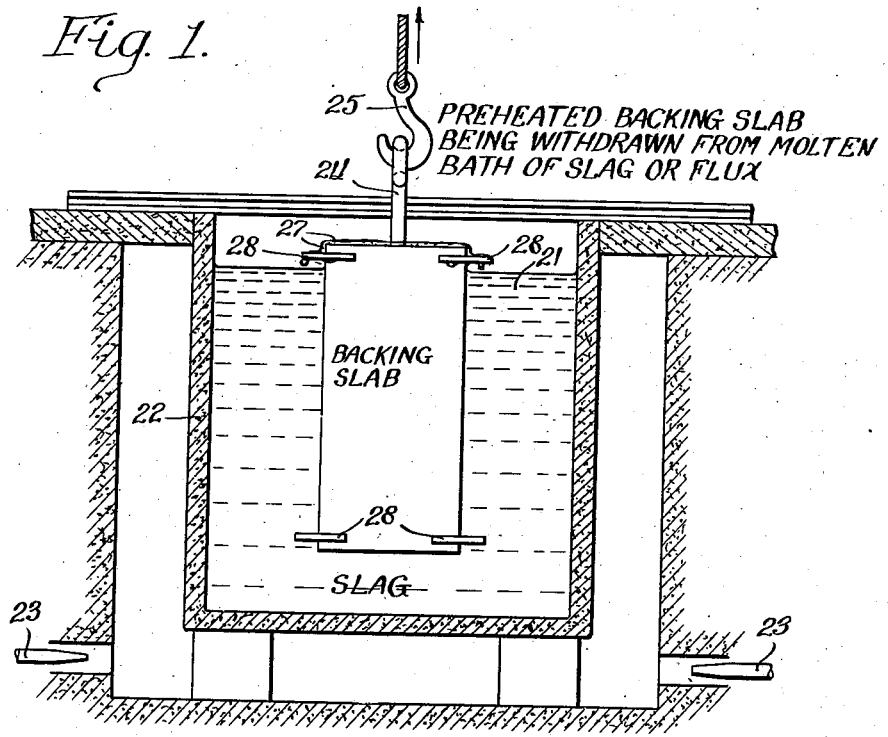
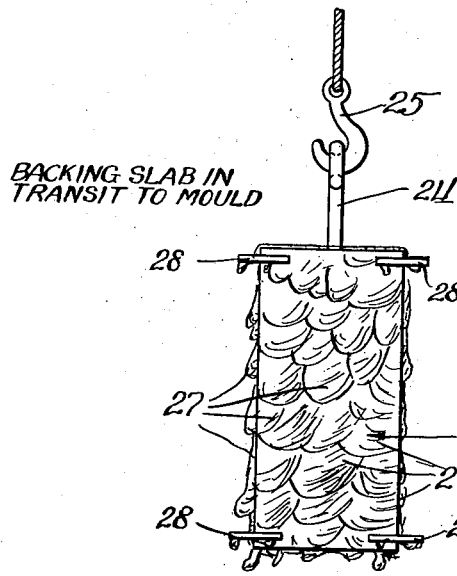
Inventor:
Thomas B. Chace July 28, 1942.    T. B. CHACE    2,291,026
METHOD OF PRODUCING COMPOSITE METAL PRODUCTS
Original Filed Dec. 26, 1939    3 Sheets-Sheet 2

Inventor
Thomas B. Chace

July 28, 1942.  T. B. CHACE  2,291,026
METHOD OF PRODUCING COMPOSITE METAL PRODUCTS
Original Filed Dec. 26, 1939  3 Sheets-Sheet 3

Inventor:
Thomas B. Chace

Patented July 28, 1942

2,291,026

UNITED STATES PATENT OFFICE 2,291,026

METHOD OF PRODUCING COMPOSITE METAL PRODUCTS

Thomas B. Chace, Winnetka, Ill., assignor to Clad Metals Industries, Inc., Chicago, Ill., a corporation of Illinois Original application December 26, 1939, Serial No. 310,894. Divided and this application March 6, 1941, Serial No. 382,006

2 Claims. (Cl. 22—204)

My invention relates, generally, to a method of manufacturing composite metal slabs and it has particular relation to the making of such slabs by casting a cladding metal onto one or more surfaces of a backing slab disposed in a vertical mould.

This application is a division of my copending application, Serial No. 310,894, filed December 26, 1939.

An important object of my invention is to provide an improved method of preventing oxidation of the surface of a backing slab while it is being preheated and then transferred to a mould for casting a cladding metal layer thereon.

Another important object of my invention is to provide an improved method of cladding a facing metal onto a backing metal by casting in vertical moulds to obtain a diffused bond between the facing metal and the backing metal that is capable of being worked without the cladding metal separating from the backing metal.

A further object of my invention is to provide an improved method of cladding a facing metal onto a backing metal in a separable mould construction for receiving a preheated backing slab and which is adapted for vertical casting therein of metal for cladding on one or more of the surfaces of the backing slab.

Still another object of my invention is to provide for bottom pouring of the cladding metal in the improved mould constructions.

Other objects of my invention will, in part, be obvious and in part appear hereinafter.

Now, in order to acquaint those skilled in the art with the manner of carrying the method of my invention into effect, reference may be had to the following detailed description, taken in conjunction with the accompanying drawings, in which:

Figure 1 is a vertical sectional view of a soaking pit in which a slab of backing metal is preheated in a flux or slag bath;

Figure 2 shows how the surface of the backing slab is prevented from contacting with air by the coating of slag or flux while it is being transferred from the soaking pit to the mould;

Figures 5, 6:
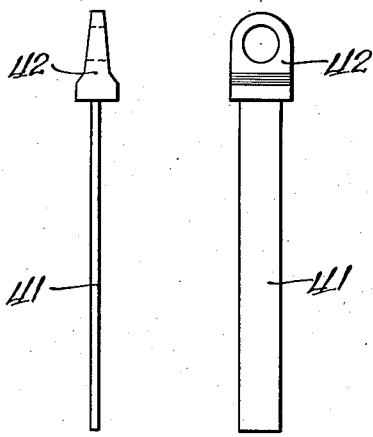
Figure 7:
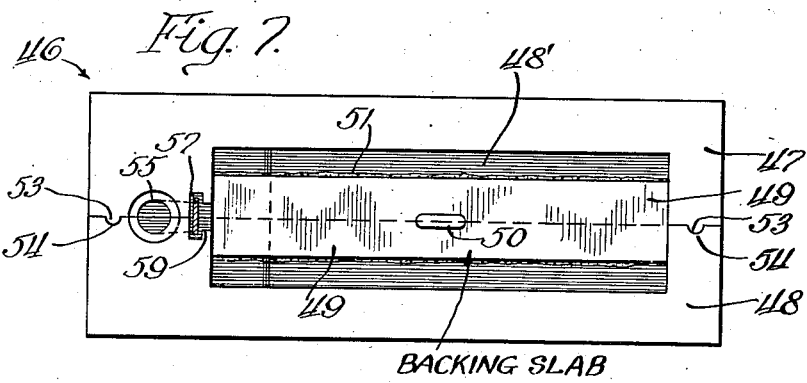
Figure 8:
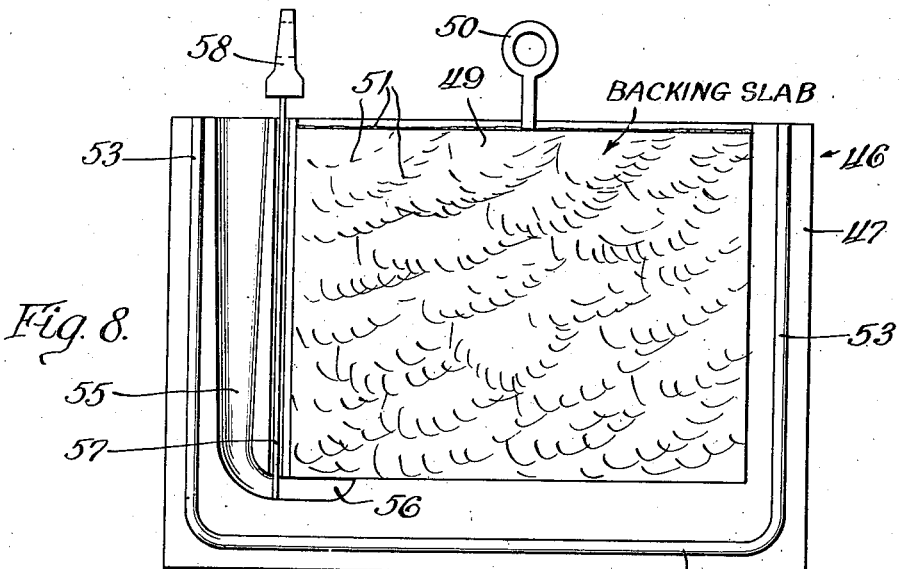
Figure 9:
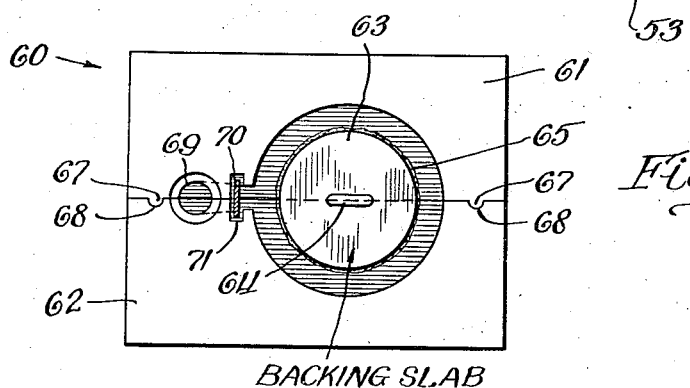

Figures 5 and 6, respectively, are side and front elevational views of a valve that may be employed in connection with the various types of moulds shown in the drawings;

Figure 7 is a top plan view of a mould that is arranged to clad the opposite sides of a backing slab;

Figure 8 is a view in side elevation of the construction shown in Figure 7, one-half of the separable mould having been removed to show the details of construction; and Figure 9 is a top plan view of a separable mould for casting cladding metal onto the surface of a cylindrically shaped backing slab.

Figure 3:
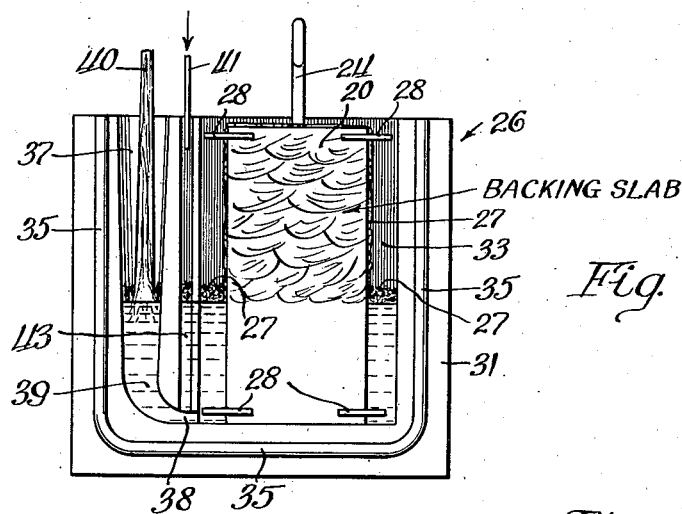
Figure 3 is a vertical sectional view of one embodiment of the improved mould construction, showing the backing slab in place and the cladding metal being poured.

With a view to practicing my invention, a steel backing slab 20, Figure 1, of suitable size is cleaned on the welding surfaces, preferably by sand blasting, and then lowered into a molten bath 21 of viscous substance in a suitable container 22. The container 22 may be heated by any suitable means, such as by gas supplied by the nozzle 23, to maintain the molten bath 21 in the molten state for preheating the backing slab 20. An eye 24 may be threaded into the top of the backing slab 20 to permit it to be picked up by a hook 25 of a crane for lifting the backing slab 20 into and out of the container 22. After the backing slab 20 has been preheated to the desired extent, it may be removed from the container 22 and transported to the mould shown generally at 26 in Figures 3 and 4 of the drawings. As shown at 27 in Figure 2, the surfaces of the backing slab 20 are covered by a layer 27 of the material forming the bath 21, so that during transit to the mould 26 the surfaces are prevented from coming into contact with the air and are, therefore, not oxidized.

With a view to centering the backing slab 20 in the space provided therefor in the mould 26, guide members 28, in the form of steel plates, may be welded to the upper and lower corners, as illustrated, thereby insuring that a coating of substantially uniform thickness will be applied to the backing slab. Preferably, the guide members 28 are welded into place before the backing slab 20 is sand blasted.

The chemistry of the bath 21 is dependent on the combinations of metals to be clad and the required preheating temperatures. The required properties are, a relatively low melting temperature and a relatively high viscosity at temperatures well above the melting temperature. For instance, for preheating temperatures around 2300° F. I have found that a mixture of about 80% borax and 20% by weight boric acid is suitable. The fusing temperature and viscosity of the bath 21 may be increased by adding more borax, silicic acid, or quartz. It can be decreased by increasing the boric acid content. A base of cullet (broken glass) with boric acid added to decrease the viscosity has been found usable.

The bath 21 is in the form of slag or flux. The melting temperature of the bath 21 should be low enough so that, when it is heated to about 2300° F., it does not chill below its fusing temperatures when the cold backing slab 20 is lowered into it.

The backing slab 20 is left in the bath 21 of slag or flux until it is thoroughly preheated. The time required is usually about one hour for each inch of thickness of the slab 20. During preheating the surface of the slab 20 is perfectly sealed from the atmosphere by the bath 21 and, on removing it from the bath 21 for transporting to the mould 26, a layer of the slag or flux forming the bath 21, of about $\frac{1}{32}''$ in thickness, clings to its surface as indicated at 27 in Figure 2. As a result of numerous tests on slabs preheated in a bath 21 having the correct composition, I have found, on cooling the slab to room temperature, that its surface under the coating 27 is clean and entirely free from oxidation. The layer 27 of slag or flux hardens on cooling below its melting temperature and may readily be broken off. However, during transit of the slab 20 from the bath 21 to the mould 26, or until the layer 27 is cooled below its melting temperature, it clings to the surface of the slab 20 and will stand relatively rough handling without exposing the slab surfaces to which cladding metal is to be applied. If the slab 20 is scraped against an object during transit to the mould 26, the layer 27 parts but quickly closes before appreciable oxidation can take place. Of course, the stored heat in the preheated slab 20 will keep the layer 27 viscous for a relatively long time, so that it is unnecessary to take special precautions for quickly transferring the slab 20 from the bath 21 to the mould 26.

Figure 4:
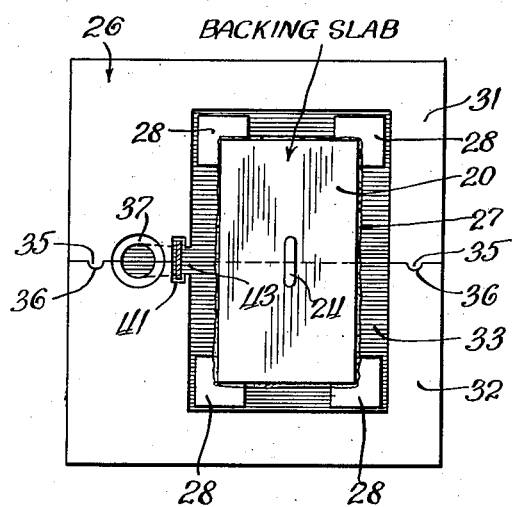
Figure 4 is a top plan view of the mould and backing slab shown in Figure 3.

As shown in Figure 4 of the drawings, the mould 26 comprises two sections 31 and 32 which, when fitted together, provide a mould space 33 for receiving the backing slab 20. The opposing faces of the sections 31 and 32 are provided with a tongue 35 and a groove 36, respectively, to prevent the escape of the cladding metal along the parting line of the mould 26. If desired, suitable clamping means may be provided for insuring that the sections 31 and 32 will not be separated while the cladding metal is being poured.

The bottom pouring of the cladding metal is accomplished by means of a pouring sprue or spout 37 having at its lower end a gate 38 that opens into the mould space 33 at the bottom thereof. The cladding metal 39 is poured into the sprue or spout 37, as indicated by the stream of molten cladding metal 40, and it fills the mould space 33 from the bottom thereof. As the cladding metal 39 rises upwardly in the mould space 33, the slag or flux from the bath 21, as indicated by the reference character 27, and other inclusions, will float to the surface readily, as indicated. It will be observed that the pouring sprue or spout 37 is positioned along the parting line between the two sections 31 and 32 of the mould 26. This is an important feature of my invention, for it facilitates the separation of the two sections 31 and 32 after the cladding metal has solidified.

In order to further facilitate removal of the mould sections 31 and 32, a valve member 41 (Figures 5 and 6), having a handle 42 at its upper end, is adapted to be slidably mounted in a suitable groove 43 that, as shown in Figure 4, opens into the mould space 33. The valve 41 may be formed of a suitable piece of steel strip and at its lower end it is arranged to completely close the gate 38. On cooling of the cladding metal 39, the portion thereof that remains in the pouring sprue or spout 37 will be separated from the rest of the cladding metal in the mould 26 by the closing of the gate 38 with the valve 41.

In order to prevent the cladding metal 39 from welding to the surfaces of the mould 26 with which it comes in contact, and the valve member 41, these surfaces are provided with a suitable covering material, such as graphite, before the backing slab 20 is inserted. The cladding metal then welds only to the surfaces of the backing slab 20 in the intended manner, and it is a simple matter to remove the mould 26 therefrom.

By having the sprue or spout 37 at the parting line of the mould sections 31 and 32, the metal that solidifies therein is easily removed on parting, so that the mould members 31 and 32 may again be used. Thus, if the sprue 37 were entirely within one or the other of the mould sections 31 or 32, it would be difficult to remove the solidified metal therefrom after cooling.

The cladding metal 39 is generally of a character that cannot readily be cast in a mould of the open-face type. This is particularly true when the composite slab is intended to have a smooth, rollable surface after casting and bonding of the facing metal onto the backing slab so that separation will not occur on subsequent working. Metals, such as pure copper, and copper alloys such as high nickel-copper alloys and copper-nickel-zinc alloys, are, in the molten state, very susceptible to the occlusion of gases and form a thick dross on the exposed surface. Such metals and alloys should be cast in a vertical mold, of the type shown in Figures 3 and 4 of the drawings, for cladding to the steel backing slab 20, so that the unrollable part is formed on the upper end of the composite slab, rather than on a rolling surface.

I have found that other copper alloys, such as silicon-nickel-copper alloys, can be readily cast onto backing slabs in accordance with my invention. The nickel in these alloys is employed to facilitate bonding to the backing slab and the silicon-nickel, in combination, forms nickel silicides for the purpose of making the copper more refractory, so that it has substantially the same compression resistance in rolling or working as the steel backing slab. This is of particular importance for copper clad steel that is clad on two or more sides, since such composite slabs are often rolled into products such as I-beams, Z-bars, and the like, on suitably shaped rolls. Such products require diamond, oval, and other irregularly shaped passes and, of course, it is essential that the two metals forming the composite slab elongate substantially the same amount for each pass. In order to accomplish this, I vary the silicon and nickel content of the copper facing alloy to suit the carbon content of the steel. For example, the resistance to compression or force of the rolls with the same compression rate at 1600° F. for wrought iron of about 0.02% carbon, mild steel of about 0.08% carbon, and medium steel of about 0.45% carbon is, respectively, 14,000—21,000 and 33,000 lbs. per sq. inch. To secure the same properties in the composite slab so that it rolls as if it were made of a single metal, I use with wrought iron of about 0.02% to 0.04% carbon a copper alloy of approximately 0.25% to 0.50% silicon and 0.60% to 0.75% nickel. For mild steel having a carbon content of about 0.08% to 0.12% I use 0.50% to 0.90% silicon and 1.0 to 1.25% nickel. For medium steel having a carbon content of from 0.25% to 0.45% I use approximately 1.2% to 1.5% silicon and 1.5% to 2.0% nickel. I find that, if the nickel content is kept slightly in excess of the silicon content, bonding is greatly facilitated without requiring any extended soaking with the copper in the molten state. This also seems to eliminate any hot or cold short ranges in annealing or rolling.

In Figures 7 and 8 of the drawings I have illustrated a mould, shown generally at 46, that comprises sections 47 and 48 for receiving in a mould space 48' provided thereby a backing slab 49. In this embodiment of the invention the backing slab 49 is to be provided with cladding metal on two sides only and, therefore, the other sides are not intended to be clad and are arranged to fit snugly against the ends of the mould space 48', as illustrated. A suitable eye 50 may be provided for lifting the backing slab 49 from the preheating bath, such as the bath 21 shown in Figure 1 of the drawings, to the mould 46. The layer 51 of slag or flux from the bath serves to protect the welding surfaces of the backing slab 49 from oxidation, as previously described. The sections 47 and 48 are provided, respectively, with a tongue 53 and a groove 54 to prevent escape of the molten cladding metal along the parting line of the mould. A pouring sprue or spout 55 is provided having a gate 56 at the bottom to provide for bottom pouring of cladding metal into the mould space 48' for the reasons set forth hereinbefore. It will be observed that the gate 56 extends across the bottom of the mould space 48' to permit the flow of the molten cladding metal into the spaces between the surfaces of the backing slab 49 to be cladded and the opposite walls of the mould sections 47 and 48. A suitable valve member 57 having a handle 58 is provided in a suitable recess 59 for separating the molten cladding metal in the pouring sprue or spout 55 and the gate 56, to facilitate removal of the backing slab 49 after the metal has solidified. It is important to have the pouring sprue or spout 55 and the gate 56 on the parting line, as explained heretofore.

In Figure 9 of the drawings I have illustrated a separable mould 60 comprising sections 61 and 62 that is of the same general construction as described hereinbefore, but which is especially designed for applying cladding metal to the surface of a backing slab 63 having a generally cylindrical shape. As shown, the backing slab 63 is provided with an eye 64 for lifting it into and out of the preheating bath, such as the bath 21 shown in Figure 1 of the drawings, and transporting it to the mould 60. During transit the backing slab 63 is protected by a layer 65 of slag or flux that is picked up from the bath 21 as previously described. The sections 61 and 62 may be provided with an interfitting tongue 67 and groove 68 along the parting line to prevent escape of the cladding metal in the molten state. A pouring sprue or spot 69 may be provided along the parting line for bottom pouring of the cladding metal, and a valve member 70, similar to the valve member 41 of Figures 5 and 6, may be provided in a suitable groove 71 for segregating the cladding metal in the pouring sprue or spout from that in the gate, for the reasons set forth hereinbefore.

Since various changes in details may be made in the foregoing method, and in the apparatus for carrying out the method, I do not intend to be limited to the various details herein shown and described.

I claim as my invention:

1. The method of making and preparing a composite slab for subsequent rolling which comprises, preheating a steel backing slab, coating the surfaces to be clad with slag, enclosing the preheated and coated slab in an open top mould, filling the mould space through a pouring sprue communicating with the bottom of the mould, projecting a displacing member downwardly into the sprue adjacent the mould space while the metal in the sprue is molten, and allowing the molten copper in the sprue passageway, and mould space to solidify.

2. The method of making and preparing a composite slab for subsequent rolling which comprises, preheating a steel backing slab, coating the surfaces to be clad with slag, enclosing the preheated and coated slab in an open top vertically divided mould, filling the mould space through a pouring sprue communicating with the bottom of the mould, projecting a displacing member downwardly into the sprue adjacent the mould space while the metal in the sprue is molten, allowing the molten copper in the sprue passageway and mould space to solidify, and then separating the mould along its vertical division line which passes through the center of the sprue, displacing member and mould space to remove the cladded slab and other solidified metal.

THOMAS B. CHACE.